United States Patent [19]
Burckhardt

[11] 3,900,046
[45] Aug. 19, 1975

[54] CONTROL VALVE FOR ACCUMULATOR SYSTEMS, ESPECIALLY FOR SERVO BRAKES OF MOTOR VEHICLES

[75] Inventor: Manfred H. Burckhardt, Waiblingen, Germany

[73] Assignee: Daimler-Benz Aktiengesellschaft, Germany

[22] Filed: Dec. 12, 1973

[21] Appl. No.: 423,895

[30] Foreign Application Priority Data
Dec. 13, 1972 Germany............................ 2260799

[52] U.S. Cl. ......... 137/596; 137/627.5; 137/DIG. 2
[51] Int. Cl.............................................. F16k 11/10
[58] Field of Search............ 137/596, 596.16, 627.5; 303/52, 50, 56

[56] References Cited
UNITED STATES PATENTS
2,842,332   7/1958   Whitten........................ 137/627.5 X

*Primary Examiner*—Martin P. Schwadron
*Assistant Examiner*—Robert J. Miller
*Attorney, Agent, or Firm*—Craig & Antonelli

[57] ABSTRACT

A control valve for accumulator installations, which includes a spring-loaded first valve effective between the high pressure space and the working space whose valve closure body is operatively connected with the valve seat of a second valve, that is disposed between working space and discharge and whose valve clsoure body, in turn, is acted upon by the control magnitude; a central control slide valve member is thereby disposed in the operative connection which has a longitudinal bore extending between the working space and the second valve and which is longitudinally displaceable in a sleeve which forms or receives the valve seat of the first valve; plate-shaped abutments are thereby arranged on both sides of the sleeve while several parallel bores distributed uniformly over the circumference are provided in the sleeve concentrically about the control slide valve member which are all in communication with the high pressure space and which receive at the one end pointing toward the working space, balls serve as valve closure body which are supported against one abutment; roller bodies forming compensating pistons are sealingly inserted into the parallel bores from the other side thereof which are supported at the other abutment.

17 Claims, 3 Drawing Figures

PATENTED AUG 19 1975    3,900,046

CONTROL VALVE FOR ACCUMULATOR SYSTEMS, ESPECIALLY FOR SERVO BRAKES OF MOTOR VEHICLES

The present invention relates to a control valve for an accumulator installation, especially for energy-storage brakes of motor vehicles, with a spring-loaded first valve operable between the high pressure space and the working space, whose valve closure body is operatively connected with the valve seat of a second valve, which is disposed between the working space and the discharge, and whose closure body is acted upon by the control magnitude, whereby a central control slide valve member is disposed in the operative connection, which is provided with a longitudinal through-bore between the working space and the second valve and which is longitudinally movable coaxially within a sleeve which forms or accommodates the valve seat of the first valve.

In one prior art construction of the aforementioned type, the control slide valve member is sealed off with respect to the surrounding sleeve by a seal which has to absorb the entire pressure drop between the high pressure space and the discharge. The control slide valve member itself forms at its one end by means of a cone surface the closure body of the first valve. This arrangement has two far-reaching disadvantages. In the first instance, the described seal offers such a high friction that the proportionality between the control magnitude and the pressure in the working space is no longer assured. This alone may already be very disturbing for the functioning of the valve. One might, under certain circumstances, omit the aforementioned seal and so lap the control slide valve member in the sleeve with respect to one another that the fluid loss is negligibly small.

This, however, is impossible because as a result of the unavoidable manufacturing inaccuracies, the valve cone of the first valve now no longer is able to adjust itself on its seat and as a result thereof, it is no longer possible to cause this first valve to close tightly. This is due to the fact that the adjusting possibility of the valve cone is tied to the fit between the control slide valve member and the sleeve. This disadvantage makes very high demands as regards manufacturing accuracy and increases therefore the cost of manufacture of the entire valve.

The present invention is now concerned with the task to avoid the described disadvantages. In other words, a control valve is to be proposed by the present invention which is completely independent of friction and which as a result thereof assures under all circumstances a proportionality between the control magnitude and the working pressure. Of course, a complete sealing tightness is to be assured thereby. Additionally, the present invention aims at simplifying the manufacture to such an extent that one is able to get along with normal fits and tolerances and that additionally a certain adjustability results at the first valve.

The underlying problems are solved according to the present invention in the control valves of the aforementioned type in that plate-shaped abutments are arranged on the control slide valve member on both sides of the sleeve, in that several parallel bores distributed uniformly over the circumference are disposed within the sleeve concentrically about the control slide valve member which are all in communication with the high pressure space and which receive at the end thereof pointing toward the working space, balls as valve closure bodies which are supported at one of the abutments, and in that roller bodies are sealingly inserted into the parallel bores from the other side which are supported at the other abutment.

The construction proposes according to the present invention —which quite generally boils down to the fact that the control slide valve member now no longer has directly the function of the first valve —results in very considerable advantages. More particularly, the first valve is now replaced by several ball valves which, as known, pose no difficulties as regards sealing tightness with a careful machining of the valve seat. Also, the roller bodies operable as equalizing or compensating pistons may be manufactured relatively inexpensively similar to bearing needles and may be fitted into the bore with a very small clearance by the use of the selective assembly method. As a result of this extremely small gap, the leakage losses are very small notwithstanding the high pressure differences to be sealed off so that the losses can be neglected. The friction forces during the displacement of the entire system are also negligible since a complete adjustability exists. Furthermore, the control slide valve member may now be fitted itself in the sleeve with a somewhat larger play or clearance. The length of this gap assures a sufficient sealing effect, especially as only the pressure difference between the working space and the discharge has to be sealed off at this location and more specifically also only during the period of time, in which a pressure is being built up in the working space. The construction of this control slide valve member is so simple that it can be ground centerless and therewith becomes relatively inexpensive and accurate. Viewed from an overall point of view, at the outset a better functioning as regards the proportionality of the forces results therefore from the proposal of this invention and above all a very considerable reduction of the manufacturing and assembly costs also result therefrom.

It is additionally proposed by the present invention that the axial movability of the control slide valve member is limited in such a manner that also in the extreme open position of the first valve, the valve balls cannot fall out between the sleeve and the abutment. This limitation can be achieved by an abutment of the control slide valve member at the sleeve or at the housing. Furthermore, the possibility exists with the present invention to construct the parallel bores offset in diameter whereby the seat of the ball valves is then smaller than the diameter of the roller bodies.

In this manner, one would obtain a force acting at the control slide valve member in the direction of "closing", by means of which the spring would be assisted. The latter could therefore be constructed smaller. With an absolutely constant high pressure, it would even be feasible to completely omit the spring in that case.

Accordingly, it is an object of the present invention to provide a control valve for accumulator systems, especially for energy-storage brakes of motor vehicles, which avoids by simple means the aforementioned shortcomings and drawbacks encountered in the prior art.

Another object of the present invention resides in a control valve for energy-storage brakes of motor vehicles which assures a good proportionality between the control magnitude and the pressure in the working space.

A further object of the present invention resides in a control valve of the type described above which is simple in construction as well as relatively inexpensive in manufacture and assembly, yet assures extraordinarily good operating characteristics together with high reliability in operation.

Still a further object of the present invention resides in a control valve for accumulator installations which utilizes relatively simple and inexpensive parts yet dispenses with the sealing problems encountered heretofore.

These and further objects, features, and advantages of the present invention will become more apparent from the following description when taken in connection with the accompanying drawing which shows, for purposes of illustration only, one embodiment in accordance with the present invention, and wherein.

Figure 1:
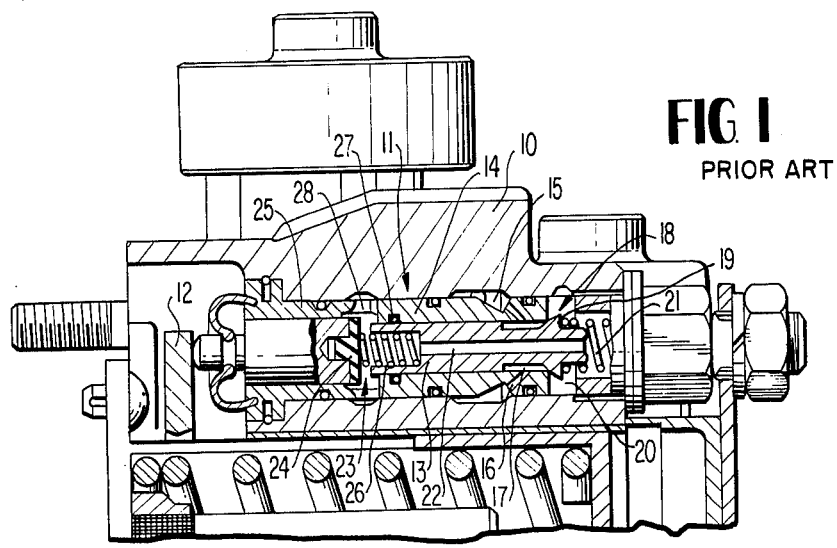
FIG. 1 is a partial axial cross-sectional view of a previously proposed control valve.

Referring now to the drawing wherein like reference numerals are used throughout the two views to designate like parts, and more particularly to FIG. 1, several control valves generally designated by reference numeral 11 are arranged in this figure concentrically about the center axis of a housing 10. All of these control valves 11 are constructed identically among each other and they are all actuated in unison by a conventional lever plate 12 which is actuated by the control magnitude in a conventional manner (not shown). A sleeve 14 which serves for the accommodation of the control slide valve member 13 is sealingly inserted into the housing 10. The high pressure space 15 is disposed approximately in the center of the sleeve 14. The high pressure space 15 is connected by way of channels 16 with the space 17 of a first valve generally designated by reference numeral 18 whose seat is formed by the sleeve 14 and whose valve closure body is formed by the cone portion 19 at the control slide valve member 13. The control slide valve member 13 is pressed against its seat by a spring 21 arranged in the working space 20. The working space 20 is connected by way of a central bore 22 in the control slide valve member 13 with the second valve generally designated by reference numeral 23 which is disposed at the upper end of the control slide valve member 13. The seat of this second valve 23 is formed by the ring-shaped end face of the control slide valve member 13 and its closure body 24 is formed by a cylindrically shaped plug which is arranged in a further sleeve 25 and is actuated by the lever plate 12. A spring 26 produces the return force at this valve. The control slide valve member 13 is sealed off with respect to the sleeve 14 by a seal 27. This seal 27 has to be able to withstand the entire pressure drop between the high pressure space 15 and the discharge 28.

The basic operation of such a control valve —assuming frictionlessness—can be readily recognized from this figure. During the occurrence of a force as control magnitude at the plate lever 12, the discharge valve 23 is closed and the control slide valve member 13 is displaced slightly toward the right so that the first valve 18 opens by a slight amount. As a result thereof, a pressure can build up in the working space 20 which then has to be in equilibrium with the force at the plate lever 12. If the pressure in the working space 20 predominates, then the second valve 23 is opened for such length of time until the equilibrium is again re-established. The reasons why this ideal functioning is impaired in practice have been described already hereinabove.

Figure 2:
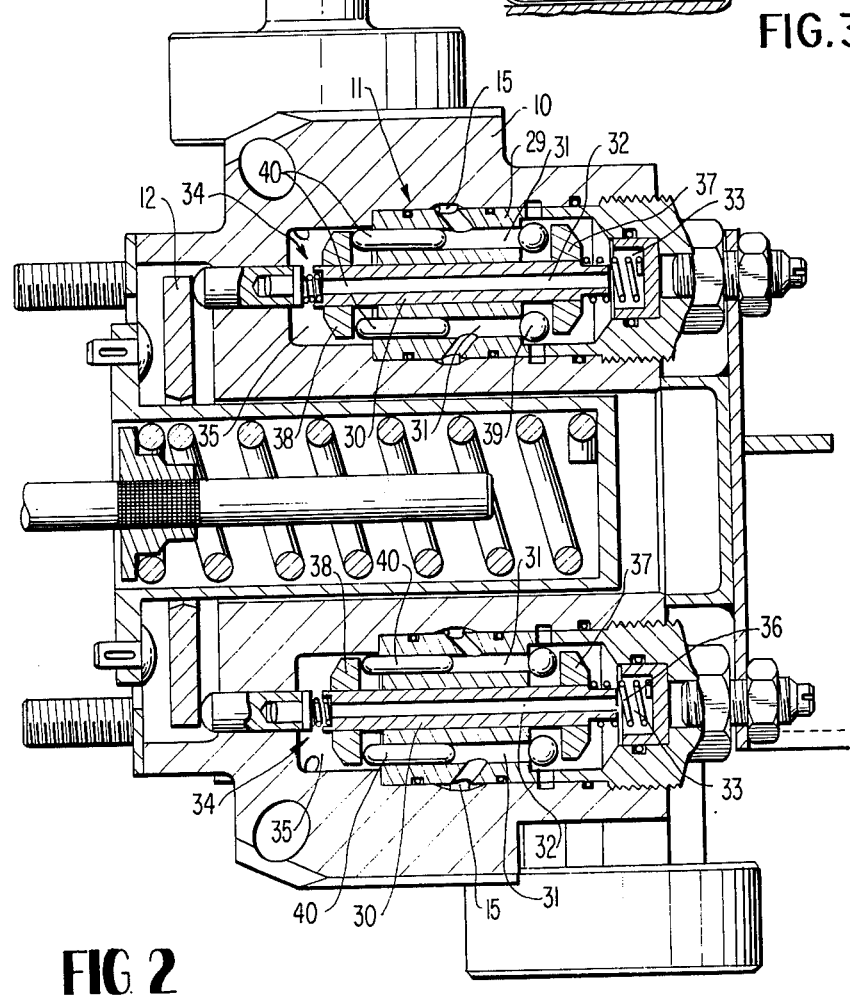
FIG. 2 is an axial cross-sectional view through an embodiment of a control valve in accordance with the present invention.

According to FIG. 2, the arrangement of the control valves generally designated by reference numeral 11 within the housing 10 takes place basically in the same manner as in the heretofore proposed embodiment according to FIG. 1. Also the construction of the plate lever 12 is the same. However, the sleeve 29 is now considerably reinforced and is again sealingly inserted into the housing 10. Several parallel bores 31 distributed uniformly over the circumference are now arranged in the sleeve 29 concentrically about the control slide valve member 30, which are all in communication with the high pressure space 15. The control slide valve member 30 has again a central through-bore 32 which leads from the working space 33 to the second valve 34 which controls the discharge 35 and which in principle is constructed in the same manner as in the embodiment according to FIG. 1. A spring 36 is again disposed in the working space 33 which forces the control slide valve member 30 toward the left with a slight force. Two abutments 37 and 38 are securely arranged on the control slide valve member 30. Balls 39 are supported against the first abutment 37 which are each coordinated to the corresponding bores 31. Together with their bores, they form altogether the first valve of this arrangement.

Roller-shaped compensating pistons 40 are supported against the second abutment 38 which are arranged in the same bores 31 opposite the balls 39. The compensating pistons 40 and balls 39 are therefore displaced away from one another by the high pressure disposed therebetween so that force equilibrium prevails at the control slide valve member 30 except for the force of the spring 36 acting in opposition to the control magnitude.

The basic operation of this valve is exactly the same as described in connection with FIG. 1. However, the control slide valve member 30 is now no longer sealed in the sleeve 29 since a sufficient sealing takes place at this location exclusively as a result of the length of the guidance. Additionally, only the pressure drop between the working space 33 and the discharge 35 now prevails at this location. The balls 39 may be caused to establish a tight sealing action by means of their valve seats without any difficulty and also the equalization pistons 40 produce a completely adequate sealing tightness in the bores 31 without special requirements as regards manufacturing accuracies.

Figure 3:
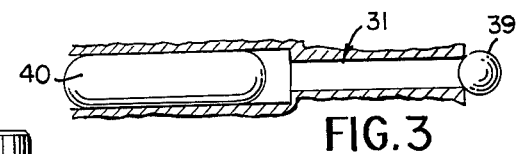
FIG. 3 is a cross-sectional view showing an embodiment in which the bores through the sleeve are offset in diameter.

According to a further feature of the present invention, the parallel bores 31 can be offset in diameter whereby the seat of the ball valves is then smaller than the diameter of the roller bodies (see FIG. 3).

While I have shown and described only one embodiment in accordance with the present invention, it is understood that the same is not limited thereto but is susceptible of numerous changes and modifications as known to those skilled in the art, and I therefore do not wish to be limited to the details shown and described

What I claim is:

1. A control valve for accumulator installations including a first valve means disposed between a high pressure space and a working space and having valve closure body means operatively connected with a valve seat for a second valve means, said second valve means being disposed between the working space and a discharge and including closure body means actuatable by a control magnitude, and a control slide valve means in an operative connection between the first and second valve means which includes a longitudinal bore between the working space and the second valve means and which is longitudinally displaceable in a sleeve means having a seat for the first valve means, characterized in that plate-shaped abutment means are arranged on the control slide valve means on both sides of the sleeve means, several parallel bores are substantially uniformly distributed adjacent the circumference of the sleeve means substantially concentrically about the control slide valve means, said parallel bores being in communication with the high pressure space and receiving at an end thereof adjacent the working space balls as valve closure means of the first valve means, said balls being supported against one of said abutments, and in that roller body means are inserted into the parallel bores from the other side thereof which are supported against the other abutment means.

2. A control valve according to claim 1, characterized in that the sleeve means forms seat means of the first valve means.

3. A control valve according to claim 1, characterized in that the sleeve means receives a seat of the first valve means.

4. A control valve according to claim 1, characterized in that the roller body means form compensating pistons.

5. A control valve according to claim 1, characterized in that the control slide valve means is longitudinally displaceable in said sleeve means substantially centrally thereof.

6. A control valve according to claim 1, characterized in that the axial movability of the control slide valve means is limited in such a manner that also in the open end position the valve balls cannot fall out between the sleeve means and said one abutment means.

7. A control valve according to claim 6, characterized in that the parallel bores are offset in diameter and the seats of the ball valves are smaller than the diameter of the roller body means.

8. A control valve according to claim 7, characterized in that the first valve means is spring-loaded.

9. A control valve according to claim 8, characterized in that the roller body means form compensating pistons.

10. A control valve according to claim 9, characterized in that the control slide valve means is longitudinally displaceable in said sleeve means substantially centrally thereof.

11. A control valve according to claim 1, characterized in that the parallel bores are offset in diameter and the seats of the ball valves are smaller than the diameter of the roller body means.

12. A control valve according to claim 1, characterized in that the first valve means is spring-loaded.

13. A control device for accumulator installations comprising: a first valve means disposed between a high pressure space and a working space, second valve means disposed between the working space and a discharge space and including actuable closure body means, and control slide valve means in an operative connection between the first and second valve means which control slide valve means includes a longitudinal bore between the working space and the second valve means and which is longitudinally displaceable in sleeve means having ends and a circumference, wherein abutment means are arranged on the control slide valve means adjacent at least one end of the sleeve means which end is adjacent to the discharge space, wherein bores are provided in the sleeve means about the control slide valve means and adjacent the circumference of the sleeve means, said bores being in communication with the high pressure space and receiving the first valve means at a first end thereof opening toward the working space, and wherein roller body means are inserted into the bores from an end opposite said first end which roller body means are supported against the abutment means adjacent the end of said sleeve means which is adjacent to the discharge space.

14. A control valve according to claim 13, wherein said sleeve means has a seat for said first valve means.

15. A control valve according to claim 13, wherein said abutment means are provided on said control slide valve means adjacent both ends of said sleeve means.

16. A control valve according to claim 15, wherein said first valve means are balls which are supported against one of said abutment means.

17. A control valve according to claim 16, wherein said bores are parallel and concentric about said control slide valve means.

* * * * *